US006451435B1

(12) United States Patent
Klafka et al.

(10) Patent No.: US 6,451,435 B1
(45) Date of Patent: Sep. 17, 2002

(54) INTERLAYER STRUCTURE FOR LAMINATED GLASS

(75) Inventors: Guenter Klafka; Richard Wiemer, both of Hamm (DE)

(73) Assignee: E. I. du Pont de Nemours & Co., Wilmington, DE (US)

( * ) Notice: Subject to any disclaimer, the term of this patent is extended or adjusted under 35 U.S.C. 154(b) by 0 days.

(21) Appl. No.: 09/581,954

(22) PCT Filed: Dec. 11, 1998

(86) PCT No.: PCT/US98/26425

§ 371 (c)(1),
(2), (4) Date: Jun. 16, 2000

(87) PCT Pub. No.: WO99/32284

PCT Pub. Date: Jul. 1, 1999

Related U.S. Application Data

(60) Provisional application No. 60/068,340, filed on Dec. 19, 1997.

(51) Int. Cl.[7] .................................. B32B 17/10
(52) U.S. Cl. .................. 428/437; 428/213; 428/339
(58) Field of Search .................. 428/339, 437, 428/525, 210, 213

(56) References Cited

U.S. PATENT DOCUMENTS

| 3,679,788 A | 7/1972 | Kiyono et al. ............ 264/211 |
| 3,982,984 A | * 9/1976 | Baldridge ................. 156/244 |
| 4,161,565 A | 7/1979 | Hermann et al. ........... 428/437 |
| 4,230,771 A | * 10/1980 | Phillips ..................... 428/437 |
| 4,292,372 A | * 9/1981 | Moynihan .................. 428/437 |
| 4,297,262 A | 10/1981 | Phillips ..................... 260/31.6 |
| 5,151,234 A | 9/1992 | Ishihara et al. ........... 264/176.1 |
| 5,227,241 A | * 7/1993 | Chaussade et al. ......... 428/437 |
| 5,270,518 A | 12/1993 | Naoumenko et al. ....... 219/203 |
| 5,560,959 A | * 10/1996 | Shimoda et al. .......... 427/163.1 |

FOREIGN PATENT DOCUMENTS

| EP | 0465698 | 1/1992 |
| EP | 0503998 | 9/1992 |
| EP | 0710545 | 5/1996 |

* cited by examiner

*Primary Examiner*—Merrick Dixon

(57) ABSTRACT

The present invention relates to an interlayer product for laminated safety glass whereby multiple layers of interlocking interlayer film having the desired properties of thickness and melt fracture surface pattern are combined to meet a specific functional need. In the present invention, two or more rolls of sheeting comprising polyvinyl butyral as the primary component are simultaneously unwound and rewound together under controlled tension, line speed and temperature so that the edges of the respective layers are aligned and roll formation is normal, the tension on the respective sheets is equal, thickness is maintained and entrapped air is minimized. The resulting product is used to produce laminated safety glass with thick interlayer construction.

8 Claims, 2 Drawing Sheets

INTERLAYER STRUCTURE FOR LAMINATED GLASS

Thios application claims the benefit pf provisional application No. 60/068,340 filed Dec. 19, 1997.

BACKGROUND OF THE INVENTION

The present invention relates to an improved interlayer product for the preparation of laminated safety glass. More particularly, the invention relates to an interlayer product for laminated safety glass whereby multiple layers of interlocking interlayer film having the desired properties of thickness and melt fracture surface pattern are combined to meet a specific functional need.

In laminated safety glass used for window glass for buildings and such, it is not uncommon for the laminator to use thicker interlayer than typically used in automotive applications, which is nominally 0.76 mm (30 mils) thick, or to combine multiple layers of 0.76 mm (30 mils) interlayer to achieve a thicker product for enhanced structural properties. There is, however, no disclosure of the manufacture or use of interlocking layers (at least two)of polyvinyl butyral containing film between layers of glass.

The extrusion process for the production of thick interlayer, that is greater than 0.76 mm (30 mils), requires high throughput rates and low line speeds, and results in deficiencies in dimensional stability, such as shrinkage, difficulty in winding and cutting, and additional manufacturing transitions and problems in generating the melt fracture surface pattern necessary for proper de-airing when laminating the glass/interlayer construction.

It has now been found that by combining, in a controlled winding process, at least two layers of interlayer of varying thickness with the desired melt fracture surface pattern in such a way that sufficient interlocking of the sheets occurs, excellent glass laminates are achieved. When unwound, the sheets may be handled as an integral unit but are not so intimately bonded that air will be trapped between the layers which will result in an unacceptable glass laminate.

U.S. Pat. No. 4,230,771 describes polyvinyl butyral laminates with tetraethyleneglycol di-N-heptanoate plasticizer. This patent specifically discloses a sheeting of polyvinyl butyral and plasticizer which was formed into a single sheeting of 0.80 mm laminated between two layers of glass. There is no teaching of multiple layers of polyvinyl butyral of any thickness.

U.S. Pat. No. 4,292,372 discloses polyvinyl butyral sheeting plasticized with a hydrolyzable ester having low acid concentration. This reference disclose a sheet of 0.03 inches which was laminated between two sheets of glass.

U.S. Pat. No. 4,297,262 describes polyvinyl butyral plasticized with tetraethyleneglycol di-n-heptanoate. The references describes the use of a single sheet of such material sandwiched between layers of glass to provide a composite material resistant to shattering.

European Patent EP 0 710 545 describes a multi-layer product for laminated glass whereby the multi-layer elements are first intimately bonded and then the desired pattern embossed upon the outer surfaces. Further, it is pointed out that if the outermost layer is not thick enough, minute disruptions occur at the interface which lead to optical distortion. The layers may consist of different plasticized polyvinyl butyral resin films having different average degrees of polymerization (delta 300–4,500) and/or having different plasticizer percentages or content (delta=5 weight parts to 50 weight parts per 100 parts of the resin which makes up each interlayer). Other differences between interlayers include films with different glass transition temperatures, etc.

In the present invention, even with pattern on both surfaces of the interface, optical distortion is not observed.

European Patent, EP 0 465 698 A1, describes a process for integrally ply-bonding two webs of paper.

SUMMARY OF THE INVENTION

In the process of the present invention, two or more rolls of sheeting comprising polyvinyl butryal as the primary component with plasticizers as the secondary component as interlayer and/or interleaving material are simultaneously unwound and rewound together under controlled tension, line speed and temperature so that the edges of the respective layers are aligned and roll fonnation is normal, the tension on the respective sheets is equal, thickness is maintained and entrapped air is minimized. The resulting product is used to produce laminated safety glass with thick interlayer construction.

The present invention therefore comprises a multilayer composite structure, comprising, in order, (a) a first layer of plasticized polyvinyl butryal; and (b) one or more additional layers of plasticized polyvinyl butryal wherein layers (a) and (b) are interlocked. This multilayer composite The present invention relates to an interlayer product for laminated safety glass whereby multiple layers of interlocking interlayer film having the desired properties of thickness and melt fracture surface pattern are combined to meet a specific functional need. In the present invention, two or more rolls of sheeting comprising polyvinyl butyral as the primary component are simultaneously unwound and rewound together under controlled tension, line speed and temperature so that the edges of the respective layers are aligned and roll formation is normal, the tension on the respective sheets is equal, thickness is maintained and entrapped air is minimized. The resulting product is used to produce laminated safety glass with thick interlayer construction structure is useful as a material which is sandwiched between layers or multiple layers of glass to form shatter resistant glass composite structures for use in automobile windows, commercial windows and the like. More particularly, the present invention comprises said multilayer composite structure wherein the first layer and the one or more additional layers are equal to or greater than 0.38 mm per layer. The preferred system or preferred multilayer plasticized polyvinyl butryal layers have either the same degree of polymerization of PVB or the same percentage of plasticizer in each layer relative to the weight of the PVB in that layer or both the same degree of polymerization and the same percentage of plasticizer.

The present invention further relates to or comprises a process for producing the multilayer composite structure described above by, (i) unwinding a first layer of plasticized polyvinyl butryal from a first roller (1') at a line speed of 10–50 meters/min. and at a temperature of 5–35° C. and at an unwind tension of 4–70 Newton meter/meter of sheet width to form a first web;

(ii) simultaneously unwinding at least one additional layer of plasticized polyvinyl butyral from a second roller (1) at a line speed of 10–50 meters/min. and at a temperature of 5–35° C. and at an unwind tension of 4–45 Newton meter/meter of sheet width to form at least a second web; and (iii) combining layers (i) and (ii) on a windup roller (5) to form an aligned interlocked multilayer composite structure.

Thus, PVB sheeting between 15 and 60 mils (0.38 mm to 1.52 mm) may be utilized with the tension varying accordingly. The process may further comprise unwinding a protective sheet of polyolefin from an unwind roller (1″) at a tension of 2 to 5 Newton meter/meter simultaneously with the first and second rollers and, in step (3), combining layers (i) and (ii) with the protective sheet as the top layer on the windup roller (5) to form an aligned interlocked multilayer composite structure having a protective sheet of polyolefin.

The present invention further relates to a multilayer composite structure produced from the process(es) recited above.

The present invention also relates to a multilayer composite structure, comprising, in order, (a) at least one glass layer;

(b) at least two interlocking layers of plasticized polyvinyl butyral; and (c) at least one additional glass layer and relates to said multilayer composite structure produced by (i) forming at least two interlocking layers of plasticized polyvinyl butyral and (ii) sandwiching the at least two interlocking layers between glass layers (a) and (b) wherein the interlocking layers before step (ii) have not been exposed to ambient temperatures greater than 10° C.

DETAILED DESCRIPTION

Figure 1:
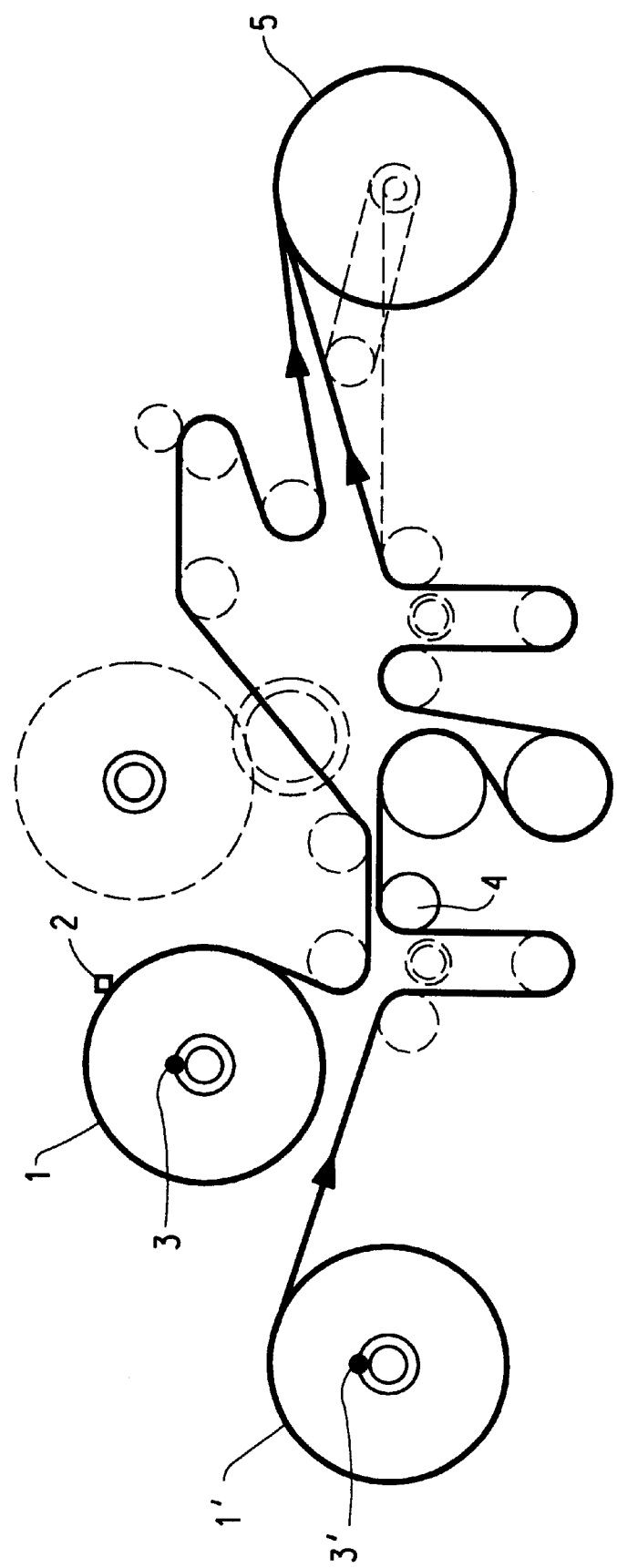
FIG. 1 is a side elevation view of the interleaving process showing the sheet path for combining two rolls of interlayer.

In the laminated glass industry, especially in architectural applications, it is often the case that multiple layers of polyvinyl butyral sheeting interlayer are used to achieve specific structural properties. The final thickness of the multiple layers is completely dependent on the strength properties desired.

Polyvinyl butyral sheeting interlayer can be produced by extrusion processes well known in the art. Such process are described in, for example, U.S. Pat. Nos. 4,230,771; 4,292,372; 4,297,262; 3,679,788; 4,161,565 and 5,151,234 which are hereby incorporated by reference. This sheeting typically contains a large percentage of plasticizer-e.g., about 30–50 parts by weight per 100 parts by weight of polyvinyl butyral are used. The plasticizers suitable for this purpose include but are not limited to dibutyl sebacate, triethylene glycol di(2-ethyl butyrate), triethylene glycol di(2-ethyl hexanoate), di(beta-butoxyethyl) adipate, dihexyl adipate, triethylene glycol di-heptanoate, tetraethylene glycol diheptanoate, tetraethylene glycol di(2-ethyl hexanoate), and butylbenzyl phthalate.

The preferred plasticizer is tetraethyleneglycol di-heptanoate. The preferred range or amount of plasticizer is 35–45 parts by weight per 100 parts by weight of polyvinyl butyral.

Suitable polyvinyl butryals for the manufacture of sheets for laminates also include, for example, those which contain, besides polyvinyl butryal units, from 17–25 weight %, preferably 20.5–23.5 weight percent, of polyvinyl alcohol units, and less than 5 weight percent of polyvinyl acetate units.

The term polyvinyl butyral in a layer or sheet described herein also includes those polymers having these additional monomeric units.

Suitable glass layers to form the multilayer composite structures having the interlocked multilayers of the invention therein are obtained and/or formed from known sources. This multilayer glass structure is then utilized in automobiles or buildings or the like.

The form of the embossment created on the surface of the sheeting consists of multitudes of discontinuous unoriented minute indentations and protuberances (random form) and the roughness, R, of the embossment formed on the sheet surface can be adjusted to a value in the range of 15–70 $\mu$m, which is appropriate for use in the manufacture of laminated glass, or more preferably, to a value in the range of 20–50 $\mu$m. in this case, embossment is really melt fracture pattern and not a mechanical embossment with rolls.

However, there are disadvantages to producing interlayer substantially thicker than 0.76 mm (30 mils), the standard for automotive safety glass applications, by the extrusion method. These include high throughput rates but low line speeds, deficiencies in dimensional stability, such as shrinkage, difficulty in winding, time consuming transitions and waste generation, and, more particularly, difficulty in generating the melt fracture surface pattern necessary for proper de-airing in the glass lamination process.

Other methods well documented in the art used to create the surface pattern on interlayer for making laminated safety glass include embossing and extrusion through custom dies with serrated lips. All of these add complexity and cost to the extrusion process.

Surface roughness of polyvinyl butryal sheeting interlayer is typically measured with a surface profilometer. The parameter $R_z$, the ten point peak height average, and $S_m$, the average spacing between peaks, as defined in American National Standard B46.1-1985, are commonly used to characterize roughness. The higher the $R_z$ value the rougher the pattern and the higher the $S_m$ value the fewer the peaks per unit distance.

Short vinyl, a lamination defect, is a pulling in of the vinyl from the edge of the glass and is caused by excessive shrinkage of the vinyl before it is bonded to the glass. In the finished product, it can lead to delamination on exposure and is unacceptable.

It has now been shown that plasticized polyvinyl butryal sheeting interlayer can be produced by combining multiple thinner layers in a controlled winding operation to produce an interlocked multilayer PVB sheeting useful as an interlayer between glass layers. By using individual layers with a surface roughness pattern for the specific laminating application utilized such as nip rolling, vacuum bag or vacuum ring, the final composite can meet all the needs of the laminated glass industry without sacrificing process and properties as noted above.

When the multiple layers of melt fracture pattern polyvinyl butryal sheeting interlayer are combined in the process described in FIG. 1, the resulting composite structure surprisingly behaves as an integral unit when used for making laminated glass. The light bonding of the layers is the result of mechanical locking of the random melt fracture surface pattern.

The term "interlocking" means the bonding between the two or more layers of plasticized PVB sheeting is sufficient to permit uniform unwinding of the composite, ease of cutting, and positioning on the glass but not so intimate bonding that air cannot be easily eliminated by methods typically used in the laminated glass industry. This unexpected feature is important because separation would make handling difficult and trapped air will result in bubbles in the laminate which makes them useless. The peaks and valleys of the opposing plasticized PVB sheets align and mesh such that the sheets behave as one sheet without the defects that are normally associated with sheets thicker than 0.76 mm.

The term "interlocked or interlocking" also means that the plasticized PVB interlayers described herein are produced using the process of the invention. In this case, for such products produced by this process, there is no requirement or need for the two or more plasticized PVB layers to be identical in degree of polymerization and/or percentage of plasticization so that compositions or resins such as those described in EP O 710 545 A1 or otherwise herein may be utilized provided said layers are produced according to the process described herein. The process of producing interlayers as claimed herein is in sharp contrast to a stack and compression method such as that described in the above patent application EP 0 710 545 A1. Additional steps performed after the process of this invention can be used to simulate this stacking method such as achieving intimate bonding (noninterlocking) by heating a product produced by the process of this invention at temperatures greater than 10° C.

Figure 2:
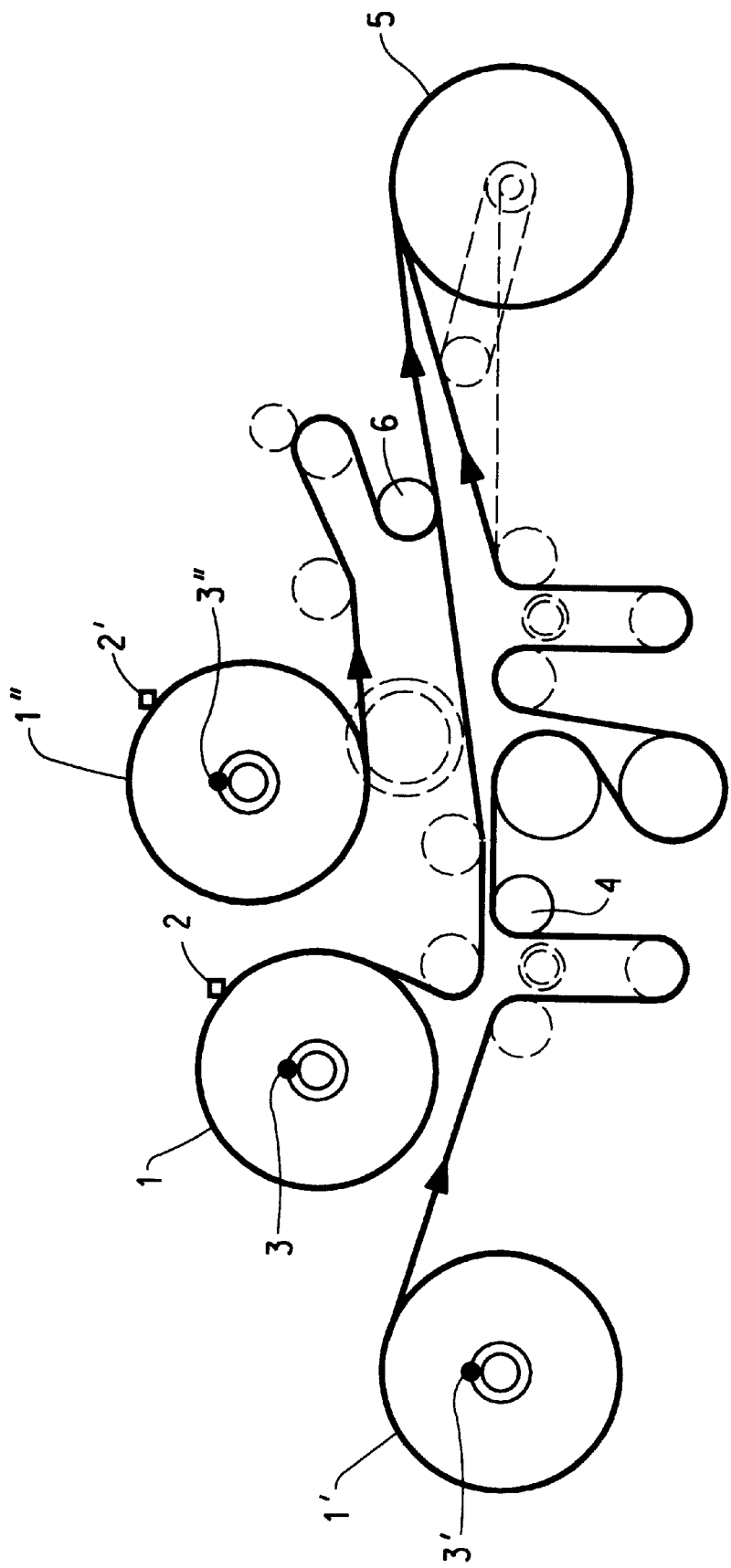
FIG. 2 is a side elevation view of the interleaving process showing the sheet path for combining two rolls of interlayer plus a separating interlayer or three rolls of interlayer.

The process of the present invention is generally carried out according to the schematic drawings in FIG. 1 and FIG. 2.

In carrying out the process of the present invention according to FIG. 1, the rollers (or rolls) to be combined are placed in the unwind positions 1 and 1'. It has been shown that controlling the unwind tension, line speed and temperature provides for optimum alignment, roll formation, thickness control and minimized air entrapment from loose sheeting. Line speeds between 10–50 meters/minute (32.8–164 feet/minute), preferably 25–35 meters/minute (82–115 feet/minute). The temperature of the sheeting is maintained between 5–35° C. (41–95° F.), preferably 10–20° C. (50–68° F.).

Alignment and roll formation are also enhance by having the combined webs joined for a minimum amount of machine travel, preferably just before windup.

The tension on the upper unwind roller is adjusted during the unwinding process as a function of the roll diameter, thickness and width. Using the diameter sensor 2 as a guide, the shaft brake 3 is adjusted to provide the desired tension. This tension is controlled between 4–45 Newton meter/meter of sheet width (0.07 to 0.84 pound force feet/inch of sheet width) depending upon the diameter of the unwinding roll.

The tension on the lower unwind roller is automatically adjusted by shaft brake 3' using the feedback of the load cell 4. The tension on the lower unwind is controlled to between 4–70 Newton meter/meter of sheet width (0.07 to 1.3 pound force feet/inch of sheet width).

The sheet webs are combined at the driven windup 5.

In carrying out the process of the present invention according to FIG. 2, the rolls to be combined are placed in the unwind positions 1, 1' and 1". Tension and temperature control must be maintained as described previously.

Tension on the third roller is adjusted during the unwinding process as a function of the roll diameter, thickness and width of the roll using the diameter sensor 2' as a guide to adjust the shaft brake 3". When using interleaf material, the tensions on the third roll are controlled between 2 and 5 N meter/meter of sheet width.

The use of the bowed "Polyband" expander roll 6 greatly facilitates the operation when using thin interleaf material.

The interlocked multilayer plasticized PVB sheeting is then sandwiched between layers of glass according to conventional processes to form a multilayer glass composite structure which is suitable for automotive applications as well as industrial and/or commercial windows or glass structures.

The invention is further illustrated by the following examples.

Test Methods

Short Vinyl Test

Following autoclaving, the edges of the laminate are visually inspected for the presence of short vinyl. That is, a shrinkage of the vinyl inside the laminate. If any shrinkage is found, a thin metal ruler is inserted into the gap until it seats against the polyvinyl butyral. The depth of the penetration is then measured in millimeters and the largest value measured is reported as short vinyl.

EXAMPLES

Example 1

Two rolls of 0.76 mm (30 mils ) thick polyvinyl butyral sheeting interlayer 2 meters wide (PVB, 23% PV Alcohol, <5% PV Acetate; and with 39 parts tetraethylene glycol diheptanoate per 100 parts resin) with an Rz value of 24.7 micrometers and a Sm value of 43.3 micrometers were combined in the process described in FIG. 1. The line speed was 30 meters/minute (98.4 feet/minute) and the sheeting temperature was 15° C. (59° F.). The resulting roll was maintained at typical storage temperatures,<10° C. (<50° F.), to prevent blocking of the wraps on the roll. The tension on roll 1' was 9.5 to 35 N M/M and on roll 1 was 9 to 22 N M/M.

When the material was unwound, the layers were found to be sufficiently bonded to permit handling and positioning on the glass. The glass/2-ply polyvinyl butyral sheeting interlayer/glass sandwich construction was heated in an oven to 60° C. (140° F.) and then passed through nip rollers at 1 meter/minute (3.28 feet/minute). The quality of the de-airing was excellent as judged by almost complete clarity of the post-nip construction.

Following autoclaving under standard conditions, the laminates were inspected and visually judged to be satisfactory with no bubbles or short vinyl present.

Comparative Example A

A roll of 1.52 mm (60 mil) thick polyvinyl butyral interlayer sheeting (2 meters wide with the same composition as Example 1) produced with an Rz value of 30.1 micrometers and a Sm value of 30.0 micrometers, typical for extruded thick interlayer, was unwound. No handling problems were encountered during the lay-up process. The glass/polyvinyl butyral sheeting interlayer/glass sandwich construction required 70° C. (158° F.) oven temperature to achieve almost similar clarity to Example 1 at a speed of 1 meter/minute (3.28 feet/minute).

At these processing conditions, the laminates exhibited still some clouds of air entrapment and 2–3 mm (80–120 mils) of short vinyl on the trailing edges.

Following autoclaving under standard conditions, the laminates were judged unacceptable with bubbles and short vinyl still present.

Comparative Example B

Two rolls of 0.76 mm (30 mils) thick polyvinyl butyral sheeting interlayer (2 meters wide with the same composition as Example 1) with an Rz value of 24.5 micrometers and a Sm value of 39.7 micrometers are combined in the process described in FIG. 2 using a 0.025 mm (0.001 mil) polyethylene interleaf between the wraps. The line speed was 30 meters/minute (98.4 feet/minute) and the sheeting temperature was 15° C. (59° F.) with tensions identical to those in Example 1 and including an interleaf roller tension of 2–5 N M/M. The resulting roll was purposely maintained at an ambient temperatures >10° C. (>50° F.) to force intimate bonding of the two PVB layers to simulate stacking of PVB layers as previously described in the art.

When the material was unwound, it was found that the layers were more intimately bonded than in Example 1 and more difficult to peel apart. There were no handling or positioning problems at lay-up. The glass/2-ply polyvinyl butyral sheeting interlayer/glass sandwich construction was heated in an oven to 61° C. (142° F.) and then passed through nip rollers at 1 meter/minute (3.28 feet/minute). Some trapped air between the layers was evident otherwise the clarity of the post-nip construction was similar to Example 1.

Following autoclaving under standard conditions, the laminates were inspected and judged to be unacceptable with bubbles still present indicating that intimate bonding (non-interlocking bonding) did occur. This example clearly demonstrates that the claimed product produced by the claimed process provides good physical properties without defects even for plasticized PVB compositions that are identical—e.g., have the same degree of polymerization and the same percentage of plasticizer. The claimed process is therefore much more efficient because the artisan does not have to vary the PVB sheeting to arrive at a suitable conventional thickness or thick multilayer PVB interlayer.

What is claimed is:

1. A multilayer composite structure, comprising, in order,
    (a) a first layer of plasticized polyvinyl butryal; and
    (b) one or more additional layers of plasticized polyvinyl butryal wherein layers (a) and (b) are interlocked.

2. The multilayer composite structure according to claim 1 wherein the first layer and the one or more additional layers are equal to or greater than 0.38 mm per layer.

3. The multilayer composite structure according to claim 1 wherein the plasticized polyvinyl butyral in (a) and (b) have the same degree of polymerization.

4. The multilayer composite structure according to claim 1 wherein the plasticized polyvinyl butyral in (a) and (b) have the same percentage of plasticizer.

5. A multilayer composite structure produced by a process comprising the steps:
    (i) unwinding a first layer of plasticized polyvinyl butyral from a first roller at a line speed of 10–50 meters/min. and at a temperature of 5–35° C. and at an unwind tension of 4–70 Newton meter/meter of sheet width to form a first web;
    (ii) simultaneously unwinding at least one additional layer of plasticized polyvinyl butyral from a second roller at a line speed of 10–50 meters/min. and at a temperature of 5–35° C. and at an unwind tension of 4–45 Newton meter/meter of sheet width to form at least a second web; and
    (iii) combining layers (i) and (ii) on a windup roller to form the aligned interlocked multilayer composite structure.

6. The composite structure of claim 5, wherein the first layer and the at least one additional layer are equal to or greater than 0.38 mm in thickness.

7. The composite structure of claim 5, wherein the process further comprises unwinding a protective sheet of polyolefin from an unwind roller at a tension of 2 to 5 Newton meter/meter of sheet width simultaneously with the first and second rollers and, in step (3), combining layers (i) and (ii) with the protective sheet as the top layer on the windup roller to form an aligned interlocked multilayer composite structure having a protective sheet of polyolefin.

8. The composite structure of 7, wherein the process further comprises maintaining the interlocked multilayer composite structure at a temperature of equal to or less than 10° C.

* * * * *